United States Patent [19]

Berger

[11] 4,051,985
[45] Oct. 4, 1977

[54] QUICK RELEASE CHILD'S BICYCLE SEAT

[76] Inventor: Irvin E. Berger, 4215 Grove, Skokie, Ill. 60076

[21] Appl. No.: 636,622

[22] Filed: Dec. 1, 1975

[51] Int. Cl.² ............................................. B62J 1/28
[52] U.S. Cl. ................................. 224/32 A; 280/202; 297/243; 403/353
[58] Field of Search ............... 224/32 A, 32 R, 33 R, 224/9, 31, 30 R; 280/289 R, 202; 297/243; 403/353, 315

[56] References Cited

U.S. PATENT DOCUMENTS

| 645,668 | 3/1900 | LeMoon | 224/30 |
|---|---|---|---|
| 721,427 | 2/1903 | Cope | 403/353 |
| 1,013,007 | 12/1911 | Fowler et al. | 280/202 |
| 1,082,227 | 12/1913 | Gates et al. | 280/202 |
| 1,484,876 | 2/1924 | Dobrowolski | 80/202 |
| 2,536,570 | 1/1951 | Rehn | 224/32 R |
| 3,802,598 | 4/1974 | Burger et al. | 280/202 |
| 3,902,737 | 9/1975 | Berger | 280/202 |

FOREIGN PATENT DOCUMENTS

| 1,310,653 | 10/1962 | France | 224/32 A |
|---|---|---|---|
| 52,957 | 7/1942 | Netherlands | 280/289 R |
| 5,683 | 3/1900 | United Kingdom | 224/30 R |

*Primary Examiner*—Robert J. Spar
*Assistant Examiner*—Donald W. Underwood
*Attorney, Agent, or Firm*—Alter and Weiss

[57] ABSTRACT

A carrier adapted to carry a child on the rear of a bicycle includes a tubular frame and a seat portion attached thereto. Brackets mountable on support members of the bicycle feature quick release attaching means allowing fast, simple mounting and demounting of the carrier from the bicycle, without the use of tools.

3 Claims, 18 Drawing Figures

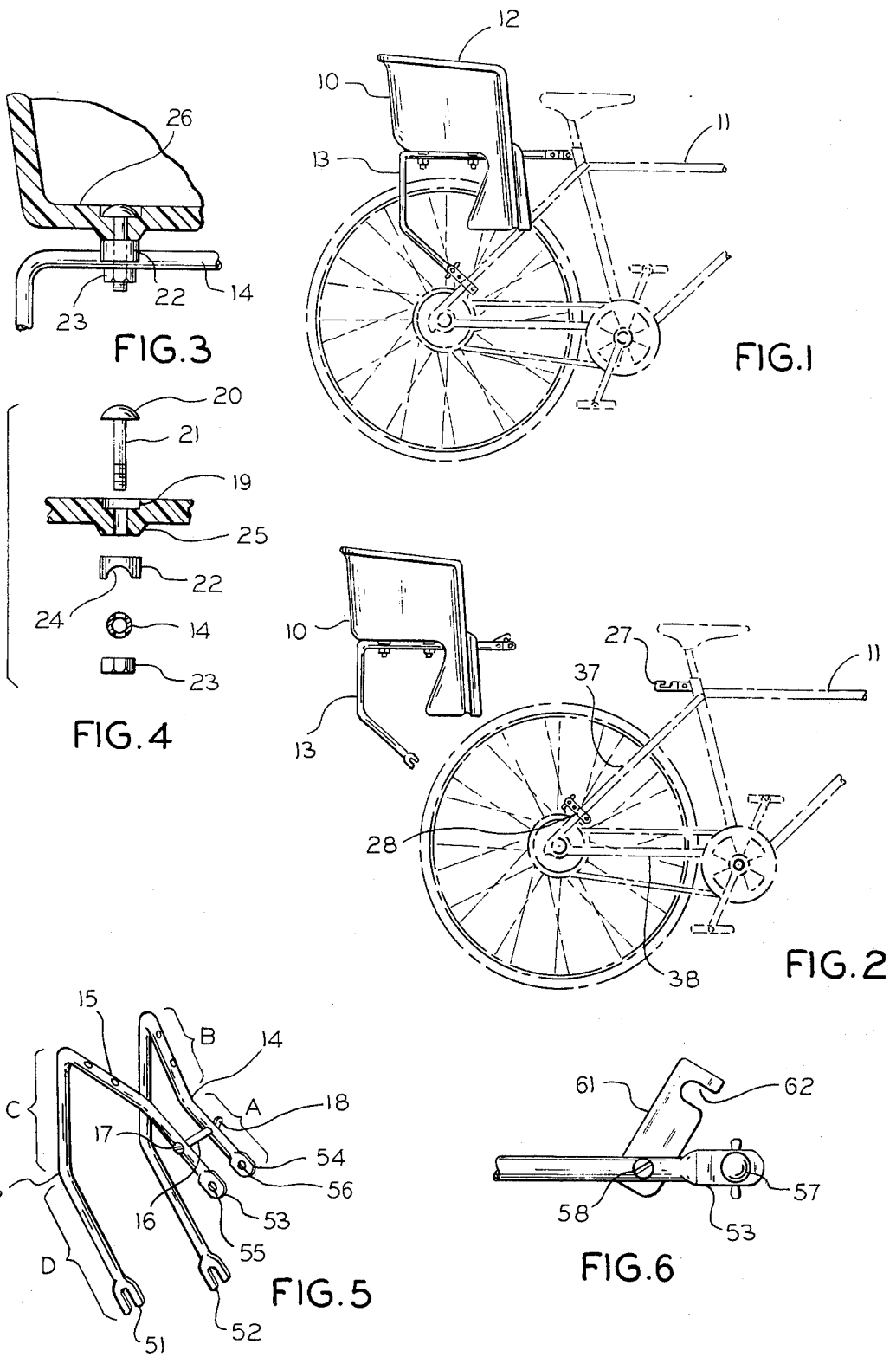

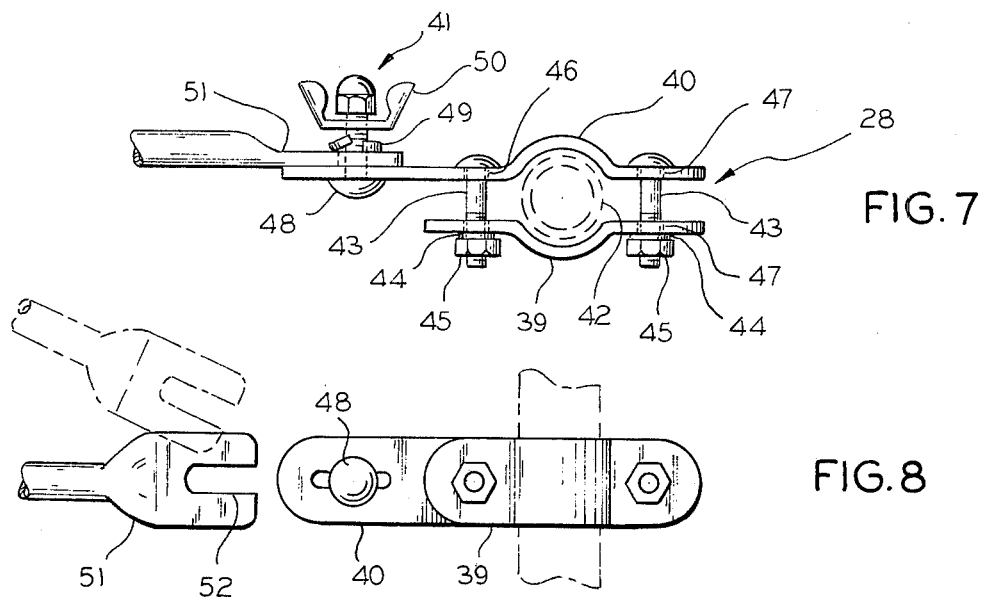
FIG. 7
FIG. 8
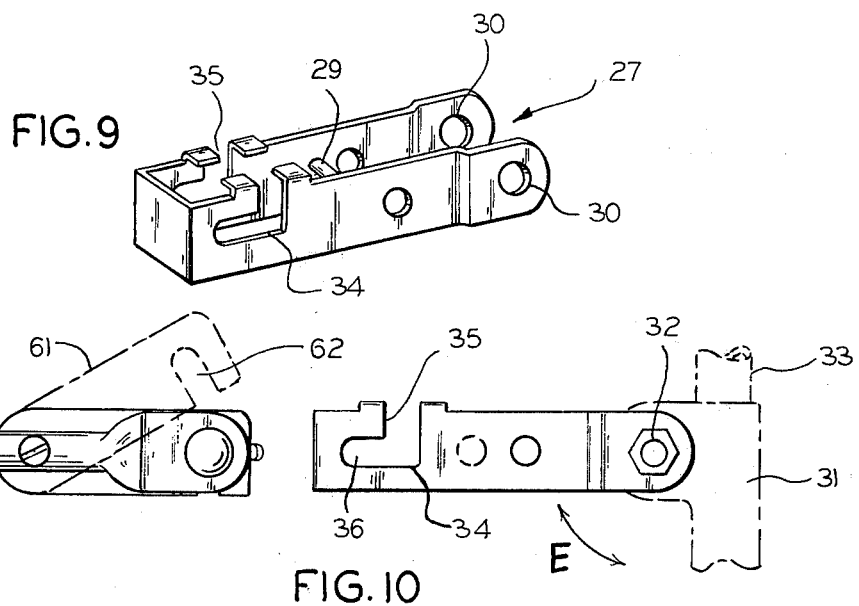
FIG. 9
FIG. 10
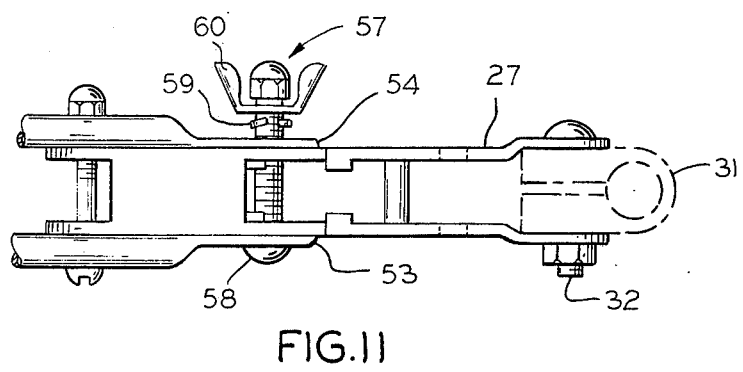
FIG. 11

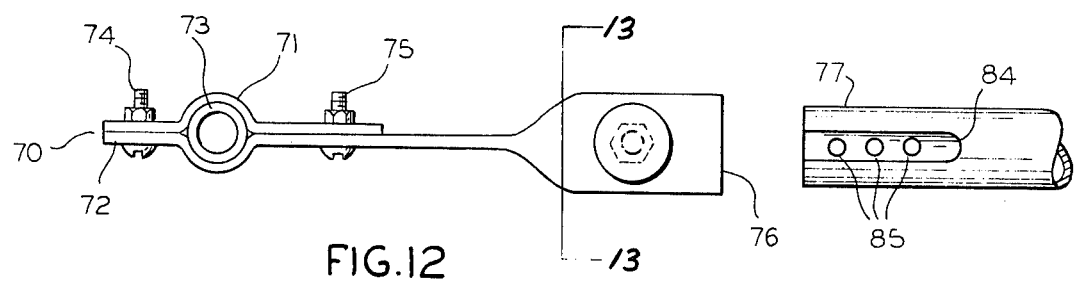
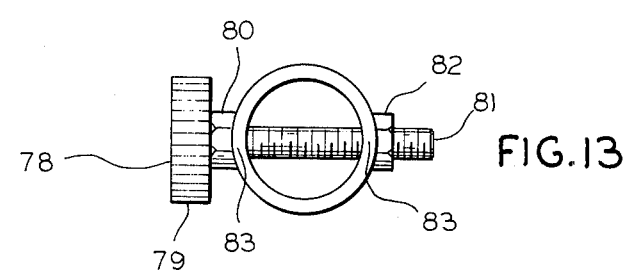
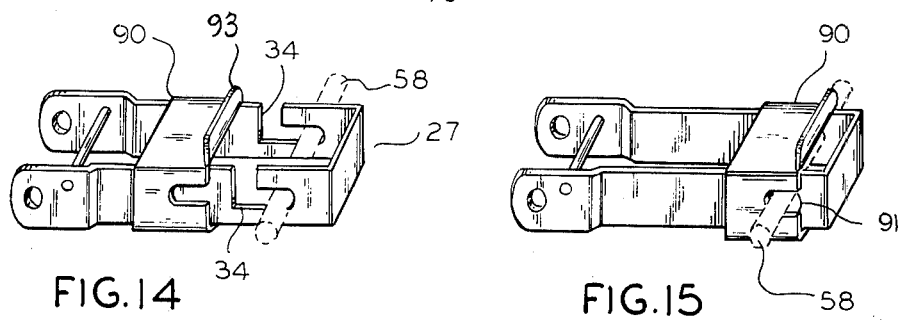
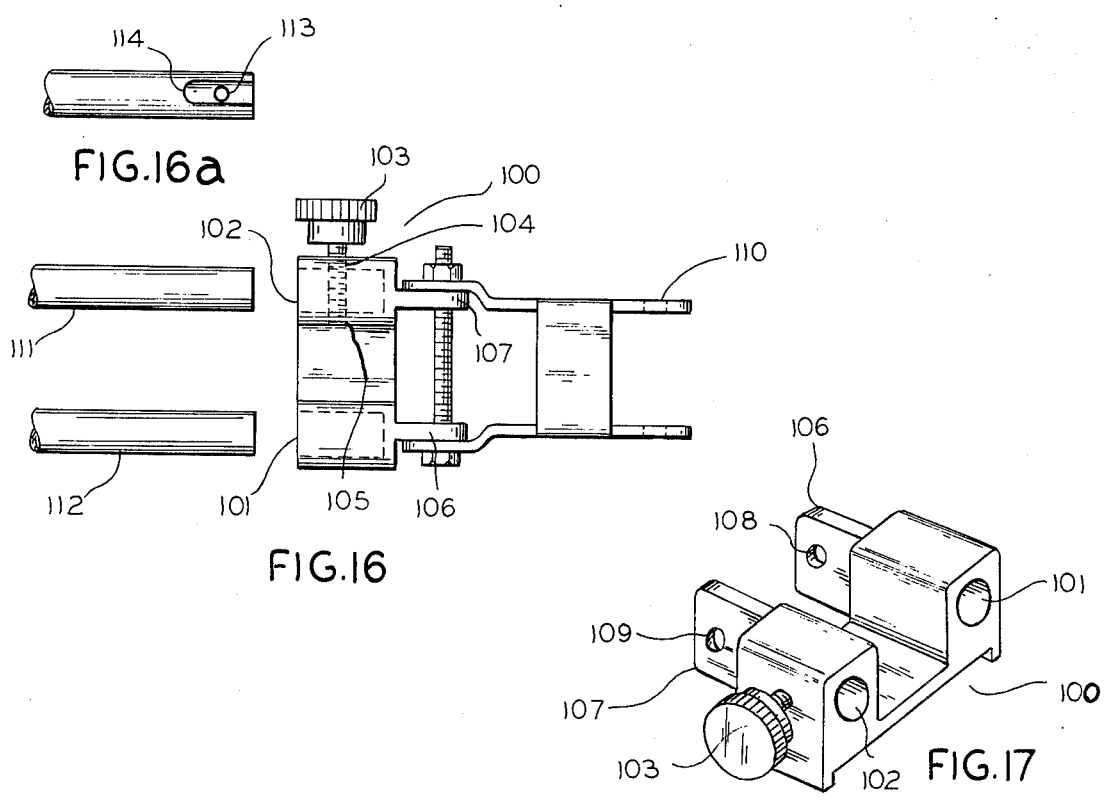

QUICK RELEASE CHILD'S BICYCLE SEAT

Bicycling is today a family sport, and participation extends even to those too young to pedal. Rear carriers to accommodate small children on bicycles ridden by adults have become increasingly popular.

One disadvantage inherent with such carriers is that once attached to the bicycle frame, they are difficult and time consuming to remove. Once mounted, such carriers generally remain mounted, adding unwanted weight and bulk to otherwise lightweight bicycles. In instances where bicycles are first transported by automobile to more remote bike trails, the bulk of a rear carrier often interferes with bicycle racks designed to carry the bicycle on the rear deck or roof of a vehicle.

Mounting and demounting of such rear carriers requires the use of tools, and as any cyclist who works on his own machine knows each time a piece of equipment is put on or taken off a bicycle frame, the cyclist runs the risk of marring the finish of a bicycle, damaging the accessory being mounted, or misaligning components such as the wheels, drive chain, free wheel and the like. As an example, many early carriers were supported by attachment to the rear axle of the bicycle. Thus, each time the carrier was mounted or demounted, the rear wheel had to be loosened and consequently realigned before being retightened, necessitating the retensioning and realignment of the drive chain as well. An earlier attempt to solve the problem of rear wheel misalignment is shown in U.S. Pat. No. 3,802,598, of which the present applicant is a co-inventor. The device therein illustrated is attachable to and supported by the bicycle frame members, rather than the rear axle. However, mounting and adjusting such a rear carrier calls for the use of tools and necessitates realignment of the seat each time it is subsequently remounted. If, for example, on a family ride, the cyclist wishes to transfer the child and carrier from one bike to the other, the carrier would then have to be demounted, using tools, and remounted, readjusted, and realigned on the second bicycle. If the second bicycle had a rear luggage carrier already installed, the mounting of a rear carrier for a child would also necessitate the removal of the luggage carrier. The cyclist would then have to carry the luggage carrier with him as he pedaled.

Thus, the need exists for a rear carrier for a bicycle quickly and easily mountable and demountable without the use of tools which, in use, is held firmly to the bicycle frame, but which may be quickly and easily removed when transporting the bicycle or riding it without carrying a child.

This invention has, therefore, the following objects:

to provide rear carriers for bicycles which are quickly and easily mounted on and demounted from a bicycle frame;

to provide such carriers with frame members which cooperate with brackets affixable to the bicycle frame members;

to provide such brackets in forms making such rear carriers universally adjustable to fit a wide variety of bicycle frame styles;

to provide such brackets with tensioning members to firmly grip portions of the rear carrier frame members;

to provide such carriers with release mechanisms operable by hand without the need for tools; yet, at the same time, difficult for a child to operate.

to provide such carriers in forms quickly transferable from bicycle to bicycle without the use of tools, once the proper brackets have been positioned on and fastened to the bicycles; and to provide such carriers in forms adaptable for being installed over a standard rear luggage carrier already in place on the bicycle.

These and further objects will become apparent from a study of the accompanying drawings, in which:

FIG. 1 is a partial elevation of a bicycle, illustrating attachment of the rear carrier;

FIG. 2 is a partial elevation of a bicycle, illustrating the rear carrier demounted;

FIG. 3 is a partial section of the seat portion of the rear carrier, illustrating attachment of the seat portion to the tubular frame of the rear carrier;

FIG. 4 is an exploded view of the attachment means illustrated in FIG. 3;

FIG. 5 is a perspective view illustrating the tubular frame of the rear carrier;

FIG. 6 is a partial elevation of the uppermost portion of the rear carrier tubular frame, illustrating the pivoted tension member, FIG. 7 is a partial elevation of the lowermost carrier frame member as attached to a seat stay bracket;

FIG. 8 is a side elevation illustrating the attachment of FIG. 7 in a disengaged attitude;

FIG. 9 is a perspective view of the seat post bracket;

FIG. 10 is a side elevation of the uppermost carrier frame member disengaged from the seat post bracket;

FIG. 11 is a top plan view of the uppermost rear carrier frame member attached to the seat post bracket;

FIG. 12 is a partial elevation of a second contemplated stay bracket assembly;

FIG. 13 is a view along line 13—13 of FIG. 12;

FIG. 14 is a perspective view of a second contemplated seat bracket; and

FIG. 15 is a perspective view of the seat bracket as shown in FIG. 14, in a closed position.

FIG. 16 is a top view of a third contemplated seat bracket;

FIG. 16a is a partial side view of a seat frame member adapted to be used with the bracket shown in FIG. 16; and FIG. 17 is a perspective view of the bracket shown in FIG. 16.

In furtherance of the foregoing objects and descriptions, Applicant herein provides, in combination with seat 10 and tubular framework 13, the improvement consisting of bracket means 27 and 28 mountable to the seat post and support members, respectively, of a bicycle, whereby said tubular frame 13 may be mounted to and demounted from a bicycle without the use of tools.

Referring now to FIG. 1, the numeral 10 indicates generally a rear carrier attached to bicycle 11. Rear carrier 10 includes one piece molded seat member 12, and tubular frame assembly 13. As illustrated in FIG. 5, frame assembly 13 is formed from tubes 14 and 15. To construct tubular frame assembly 13, tubes 14 and 15 are bent to extend horizontally parallel one to the other to form yoke A; thence to diverge substantially horizontally one from the other to form seat platform B; thence to depend vertically substantially parallel one to the other as at C; and thence to bend forward substantially parallel one to the other as at D. Thus formed, tubes 14 and 15 are held in spaced relationship by tubular sleeve 16; fastener assembly 17 is then passed through tube 14, sleeve 16 and tube 15, and is secured by nut 18.

As illustrated in FIGS. 3 and 4, seat member 12 is secured to seat platform B of frame assembly 13 through counter-sunk seat apertures 19, molded into seat 12. Head 20 of threaded fastener 21 seats in counter-sunk aperture 19, while fastener 21 passes through aperture 19, strain relief nut 22, frame member 14, and is secured by nut 23. During assembly, strain relief nut 22 is hand tightened; this prevents overtightening of bolt 20. As illustrated in FIG. 4, strain relief nut 22 is formed with concave section 24 to accommodate frame member 14. Flat-bottomed gusset 25 is molded to the bottom of seat member 12 to provide a contact point for strain relief nut 24. In the completed assembly as illustrated at FIG. 3, head 20 does not protrude above seat surface 26, and thus cannot snag or tear the clothing of a child riding in the carrier.

As illustrated at FIG. 2, rear carrier 10 is quickly and easily demountable from bicycle 11 through the use of seat bracket 27 and stay brackets 28. As illustrated at FIG. 9, seat bracket 27 is generally U-shaped, with the depending legs of the "U" reinforced in spaced relationship by shaft 29. Mounting holes 30 are formed near the end of each depending leg of bracket 28, and, as illustrated in FIGS. 10 and 11, seat bracket 28 is attachable to seat tube 31 by removing binder bolt 32 (used to adjustably hold seat post 33), aligning mounting holes 30 with the binder bolt aperture and reinserting and retightening binder bolt 32. Seat bracket 28 is thus permanently affixed to bicycle 11, and is pivotally adjustable on binder bolt 32 as shown at E.

Seat bracket 28 has slots 34 formed near the base of the "U." Each such slot has a vertically depending segment 35 open at its top, and a horizontal segment 36 meeting segment 35 substantially at right angles and extending rearwardly.

As illustrated in FIG. 2, each stay bracket 28 is fastenable to seat stay 37, chain stay 38, or any other bicycle strut member similarly or conveniently situated. Most commonly, two such brackets will be required. Stay bracket 28 includes clamp arm 39, attaching arm 40, and release mechanism 41, as illustrated in FIG. 7. Clamp arm 39 and attachment arm 40 are shaped to fit about stay 42 and are clamped tightly into place by bolts 43, lock washers 44, and nuts 45 passing through bracket apertures 46 and 47. Release mechanism 41 comprises bolt 48, split ring lock washer 49, and acorn cap wing nut 50.

As illustrated herein, bolt 48 passes through an aperture formed in attaching arm 40. If desired, bolt 48, or the shaft thereon, may be integrally attached to said arm 40, or, conversely, said aperture may be tapped to threadably engage bolt 48.

Tubular seat frame 13 has dropouts 51 and 52 formed at the lower end of each frame member 14 and 15, respectively. Each such dropout, taking dropout 51 as an example, has formed therein a slot 52, each said slot being side enough to slidingly accommodate bolt 48 as illustrated in FIGS. 7 and 8. To connect frame member 14 to stay bracket 28, dropout 51 is positioned such that bolt 48 is within slot 52, with split ring lock washer 49 positioned between dropout 51 and wing nut 50. Wing nut 50 may then be screwed tightly down onto split ring lock washer 49, thus firmly attaching seat frame member 14 to stay bracket 28.

As illustrated in FIG. 5, yoke A of tubular seat frame 13 has formed at its ends flattened tongue portions 53 and 54, in which are drilled aligned apertures 55 and 56, respectively. As illustrated in FIG. 11, yoke release mechanism 57 passes through apertures 55 and 56. In this embodiment, yoke release mechanism 57 includes bolt 58, split ring lock washer 59, and acorn cap wing nut 60. Yoke spacer 61, as illustrated in FIG. 6, is pivotally mounted to tubular sleeve 16 and has formed therein slot 62 dimensioned to fit over yoke release mechanism 58 when pivoted downwardly, as illustrated in FIG. 10.

To attach yoke A of tubular seat frame 13 to seat bracket 27, yoke spacer 61 is first pivoted upwardly. Next, bolt 58 of yoke release mechanism 57 is inserted into vertical portions 35 of slots 34, then moved rearwardly into horizontal slot portions 36. Yoke spacer 61 is then pivoted downwardly, fitting over bolt 58 and between, respectively, tongue portions 53 and 54 and the depending legs of seat bracket 28. Wing nut 60 is then tightened to complete a firm connection between yoke portion A and seat bracket 27.

Dropout 51 may be pivoted about bolt 48 when being attached to stay bracket 28; thus, as illustrated in phantom at FIG. 8, tubular frame members 14 and 15 may be angularly adjusted about bolt 48, making it possible to fit rear carrier 10 to bicycles of varying dimensions and proportions.

To attach rear carrier 10 to bicycle 11, the cyclist would first remove binder bolt 32 from seat post 31. Apertures 30 in seat bracket 27 would then be aligned with the apertures in seat post 31, and binder bolt 32 would then be reinserted and tightened. Seat bracket 27 is thus permanently affixed to bicycle 11.

The cyclist would next position stay brackets 28 on a convenient lower support member of the bicycle. In the embodiment shown herein, stay brackets 28 are fastened to seat stays 37 of bicycle 11. In positioning stay brackets 28, the cyclist must determine where dropouts 51 and 52 of tubular seat frame 13 will meet seat stays 37 when rear carrier 10 is placed on bicycle 11.

When stay brackets 28 have been properly positioned, rear carrier 10 may then be mounted on bicycle 11 by first raising yoke spacer 61 to an upright position, inserting yoke A onto seat bracket 27 to position bolt 58 of yoke release mechanism 57 in the rearmost portions of slots 34. Simultaneously, dropouts 51 and 52 of tubular frame membrs 14 and 14 are fitted to, respectively, bolts 48 of stay brackets 28. Wing nuts 50 of stay brackets 28 and 60 of yoke A are then firmly tightened to safely and securely anchor rear carrier 10 to bicycle 11.

When the cyclist is riding without carrying a child, or when the bicycle must be partially disassembled to fit onto a bicycle carrying rack or into a vehicle, rear carrier 10 may conveniently be removed by loosening wing nuts 50 and 60, leaving stay brackets 28 and seat bracket 27 still attached unobtrusively to the bicycle frame. When next the rear carrier is to be used, the cyclist will find that the respective mounting brackets, still fastened to the bicycle frame, are correctly aligned and positioned so that remounting the seat simply involves reinserting the seat yoke and dropouts into their respective brackets and tightening the respective wing nuts. Thus, once the seat has initially been installed on the bicycle, no further tools are necessary to mount or demount the rear carrier.

With subsequent sets of seat and stay brackets appropriately mounted on other bicycles, the rear carrier may then be readily transferred from bicycle to bicycle.

While the specific mounting mechanisms have been shown herein as acorn cap wing nuts it is to be understood that any conventional quick release mechanism, such as the lever type quick release mechanisms presently used to mount bicycle wheels, may also be modified to be used thereon. It is felt, however, that a wing nut arrangement or an arrangement such as a knurled plastic knob, would be easy for an adult to operate and remove, yet would be difficult for a young child to operate, thus making it unlikely that a child could loosen the seat while riding in it.

A second presently contemplated quick release stay assembly is illustrated in FIG. 12, wherein stay bracket 70 comprises clamp arm 71 and attaching arm 72, mounted on stay 73 by threaded fasteners 74 and 75. Attaching arm 72 is tubular in shape at its free end 76, and is sized to slidingly accommodate seat supporting tubular member 77. As illustrated in FIG. 13, release means 78 includes knob 79 mounted on threaded shaft 81. Lock nuts 80 and 82 are welded, respectively, about apertures 83, positioned diametrically opposite one another. Threaded shaft 81 is then threaded through lock nut 80, apertures 82 and lock nut 82. Tubular supporting member 77 has formed at its end slot 84 and mounting apertures 85, positioned diametrically opposite slot 84.

To mount tubular supporting arm 77 to stay bracket 70, knob and shaft assembly 79, 81 is unscrewed from lock nut 82 and through first aperture 83. Tubular supporting member 77 is then inserted into free end 76 of stay bracket 70, such that slot 84 passes over shaft 81 proximate to lock nut 80. Tubular supporting member 77 is then aligned to bring one of mounting apertures 85 in line with first aperture 83; knob and shaft assembly 79, 81 is then threaded through said mounting aperture 85 and through lock nut 82. Correct horizontal alignment of the rear carrier is accomplished by selectively positioning stay bracket 70 along stay 73, and by choosing an appropriate mounting aperture 85 through which to thread shaft 81.

A second contemplated embodiment of seat bracket 27 is illustrated at FIGS. 14 and 15. This embodiment dispenses with the need for yoke spacer 61 by providing latch plate 90, slidably mounted on the depending legs of the U-shaped seat bracket 27. Latch plate 90 is substantially U-shaped itself, and each depending leg has formed thereon slot 81 shaped and positioned to be in alignment with slots 34, when latch plate 90 is moved to cover said slots. In use, bolt 58 of yoke release mechanism 57 is inserted into slot 34. Latch plate 90 is then pulled forward to align slots 91 over slots 34 and about bolt 58, as illustrated at 92 in FIG. 15. Yoke release mechanism 57 is then tightened to firmly mount the carrier to seat bracket 27. Thus positioned, latch plate 90, with slots 91, effectively transforms slots 34 into holes by filling the remaining open channels of slots 34. Finger pull 93 is formed on latch plate 90 as a convenient means to slidably position latch plate 90 as required.

A third contemplated seat bracket arrangement is illustrated at FIGS. 16 and 17. Mounting bracket 100 is a milled casting having formed therein sockets 101 and 102. Knob assembly 103 is threaded through tapped hole 104, through socket 102, and into tapped hole 105. Tabs 106 and 107 have formed therein, respectively, mounting apertures 108 and 109, whereby bracket 100 is mountable to seat bracket 110, which, in turn, is mountable to the seat post of said bicycle (not shown). Seat frame members 111 and 112 are slidably insertable into ports 101 and 102. To provide a positive locking arrangement, frame member 111 has formed therein aperture 113 and slot 114, as illustrated in FIG. 16a. To mount the seat frame assembly to bracket 100, knob assembly 103 is threaded outward; frame members 111 and 112 are then inserted into ports 101 and 102. Aperture 113 is positioned on frame member 111 such that when frame member 111 is fully inserted into port 102, aperture 13 is aligned with threaded hole 105. Knob assembly 103 is then threaded through aperture 113, and into threaded aperture 105, thus securing frame member 111 removably in place.

While the foregoing description has presented a specific embodiment of the invention claimed herein, it is to be understood that this description is not intended to limit the scope of the invention. It is to be expected that variations will become apparent to those skilled in the art, which will be within the spirit and scope of the invention as claimed.

I claim:

1. In combination with a rear carrier adapted to carry a child on a bicycle having a seat tube assembly and at least one strut member, said rear carrier being attached to tubular frame means having two ends, the improvement comprising:
    seat bracket means including a hook means and being pivotally adjustably attachable to said seat tube assembly;
    strut bracket means,
    said strut bracket means being selectively positionable along said strut member;
    yoke means including a yoke pin, formed at one end of said tubular frame means,
    said yoke means further including latch plate means pivotally mounted to said yoke pin;
    hand-tightenable yoke tensioning means,
    said tensioning means positioned at said yoke means opposite said yoke pin,
    said tensioning means adapted to hook to said seat bracket means;
    said latch plate means having slots formed therein to register with said tensioning means when said tensioning means is hooked to said seat bracket means and said latch plate means is pivoted thereupon,
    said tensioning means, when tightened, thereby compressibly maintaining said yoke means, said latch plate means, and said seat bracket means; and
    hand-tightenable fastener means positioned at said strut bracket means, whereby said second of said frame ends may be compressibly maintained at said strut bracket means.

2. The apparatus as recited in claim 1 wherein:
    said rear carrier has formed along its bottom exterior surface a plurality of flat-bottomed gussets,
    each said gusset having formed therein an aperture extending through said rear carrier;
    attachment means for holding said rear carrier to said tubular frame means,
    said attachment means including a bolt dimensioned to pass through said gusset aperture,
    a strain relief nut,
    said strain relief nut having oppositely disposed faces,
    the first of said faces being flat,
    the second of said faces being concave,
    whereby said strain relief nut is threaded onto said bolt to abut said flat face against said flat-bottomed gusset,
    said concave face of said strain relief nut accommodating said tubular frame means; and
    nut means, said nut means being threadable onto said bolt means whereby said tubular frame means is compressed between said strain relief nut and said nut means, whereby the strain of tightening said nut means is thereby prevented from being transmitted to said gusset.

3. The apparatus as recited in claim 1 wherein said seat bracket means further comprises a base with a pair of legs depending therefrom in a generally U-shaped configuration, each said leg having an open-ended L-shaped slot formed therethrough which comprises said hook means, said slots oppositely disposed parallel one to another, said slots dimensioned to insertably accept said yoke tensioning means, said slots positioned whereby said open ends are closed off by said latch plate means when said latch plate means is pivoted to register with said yoke tensioning means.

* * * * *